United States Patent [19]

Ferro

[11] Patent Number: 5,180,250

[45] Date of Patent: Jan. 19, 1993

[54] SELF-LOCKING COUPLING STRUCTURE FOR CONNECTING ACCESSORIES TO PROFILED ELEMENTS

[75] Inventor: Nicoló Ferro, Trieste, Italy

[73] Assignee: Alprogetti S.r.l., Monza, Italy

[21] Appl. No.: 559,797

[22] Filed: Jul. 30, 1990

[30] Foreign Application Priority Data

Aug. 8, 1989 [IT] Italy ............................. 21475 A/89
Aug. 8, 1989 [IT] Italy ............................. 21477 A/89

[51] Int. Cl.$^5$ ............................................. F16B 5/07
[52] U.S. Cl. ................................. 403/252; 403/353; 403/381
[58] Field of Search ............... 403/353, 348, 381, 252, 403/405.1, 406.1, 387, 274, 279, 282, 409.1, 374, 263; 248/225.1, 297.2, 222.2

[56] References Cited

U.S. PATENT DOCUMENTS

| | | | |
|---|---|---|---|
| 4,099,887 | 7/1978 | Mackenroth | 403/381 X |
| 4,226,394 | 10/1980 | Einhorn | 248/225.1 |
| 4,456,211 | 6/1984 | Wyckoff | 403/252 X |
| 4,493,580 | 1/1985 | Ruehl | 403/252 |
| 4,504,168 | 3/1985 | Miller | 403/353 |
| 4,514,104 | 4/1985 | Taylor et al. | 403/381 X |
| 4,726,554 | 2/1988 | Sorrell | 248/222.2 |
| 4,783,040 | 11/1988 | Lindberg et al. | 403/387 X |
| 4,899,971 | 2/1990 | Elkin | 248/225.1 |

FOREIGN PATENT DOCUMENTS 283984 9/1988 European Pat. Off.
2436244 4/1980 France.

Primary Examiner—Peter M. Cuomo
Attorney, Agent, or Firm—Guido Modiano; Albert Josif

[57] ABSTRACT

The present invention relates to a self-locking coupling structure for connecting accessories to profiled elements which has the peculiarity of comprising a body which defines a protrusion which can be inserted between the opposite wings which delimit a seat on a profiled element. The protrusion has a curved surface which is delimited, on one side, by an engagement portion which can be inserted below one of the wings by rotation about an axis which is substantially parallel to the longitudinal extension of the profiled element and is suitable for generating a localized deformation of the wing substantially in the portion affected by the longitudinal extension of the protrusion, and, on the other side, by a stop portion which can engage below the other wing. The protrusion, in locking position, abuts against the bottom of the seat in at least two points which are mutually spaced in a transverse direction with respect to the longitudinal extension of the profiled element.

9 Claims, 3 Drawing Sheets

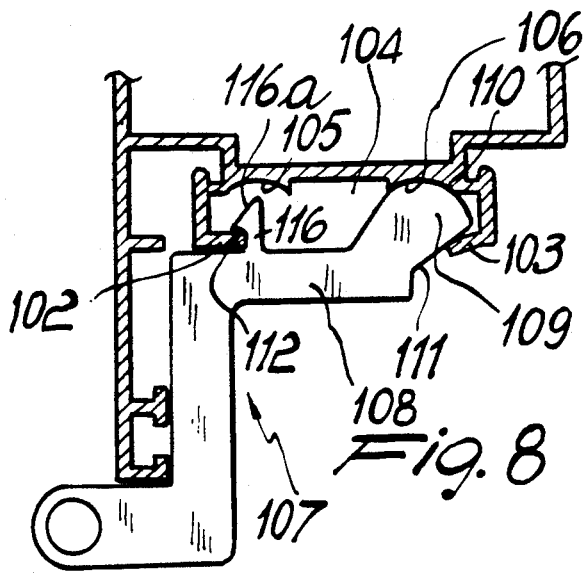
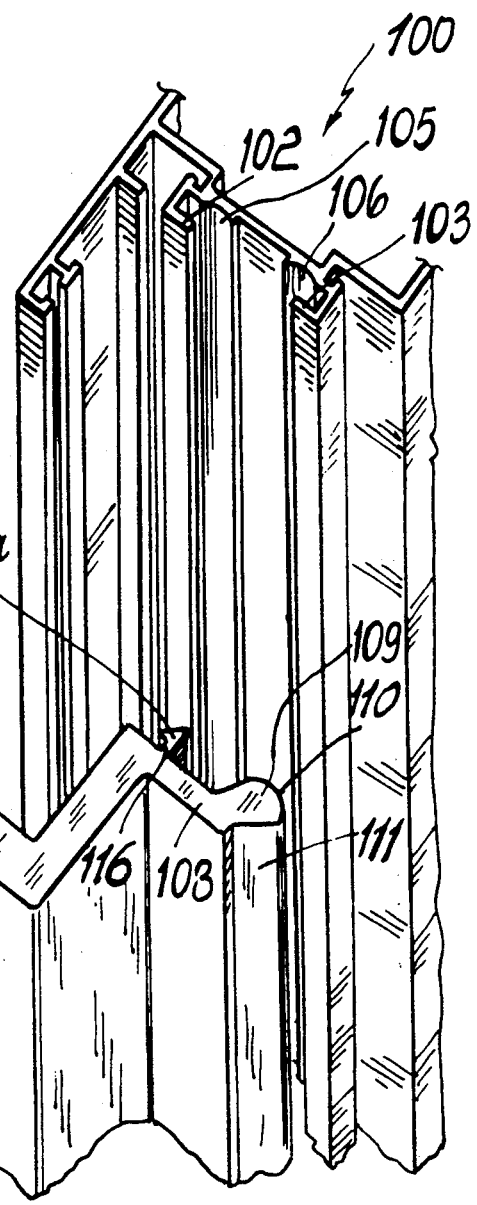
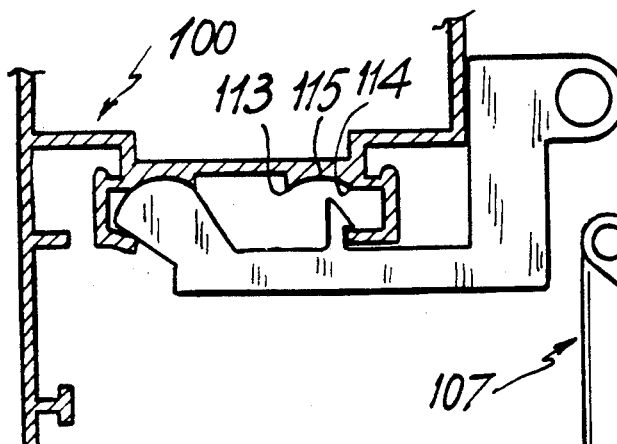
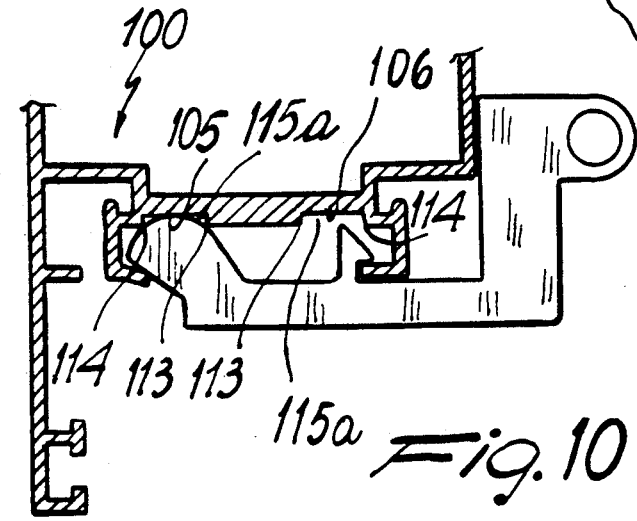

SELF-LOCKING COUPLING STRUCTURE FOR CONNECTING ACCESSORIES TO PROFILED ELEMENTS

BACKGROUND OF THE INVENTION

The present invention relates to a self-locking coupling structure for connecting accessories to profiled elements.

As is known, elements which require the execution of surface machinings on the profiled elements and furthermore usually require the adoption of screw means for securing are currently used to apply accessories on extruded profiled elements made of aluminum and alloys thereof.

In all the known solutions, considerable problems are encountered during assembly in order to secure the device, especially as regards translatory motion along the longitudinal direction of the profiled element under stress, such as for example in the case of hinges which support shutters.

Another disadvantage which can be ascribed to the solutions of the known art is furthermore constituted by the fact that the assembly times of the devices for coupling accessories such as hinges, abutments, stop elements and the like are considerable and require the use of tools, sometimes even special tools, for securing.

SUMMARY OF THE INVENTION

The aim of the invention is indeed to eliminate the disadvantages described above by providing a self-locking coupling structure which allows the safe coupling in place of the device without having to perform preliminary machinings on the profiled elements.

Within the scope of the above described aim, a particular object of the invention is to provide a coupling structure which is extremely versatile and can be inserted and locked in place with an extremely simple movement, so as to automatically create a localized deformation on the profiled element which acts as an element which prevents movement in the longitudinal direction of said profiled element.

Another object of the present invention is to provide a coupling structure which is particularly versatile so as to be suitable for the application of hinges, abutments, stop elements and of any accessory which must be applied to extruded profiled elements.

Not least object of the present invention is to provide a coupling structure which can be easily obtained starting from commonly commercially available elements and materials and is furthermore advantageous from a merely economical point of view.

This aim, the objects mentioned and others which will become apparent hereinafter are achieved by a self-locking coupling structure for connecting accessories to profiled elements, according to the invention, characterized in that it comprises a protrusion which can be inserted between opposite wings which delimit a seat on a profiled element, said protrusion having a curved surface which is delimited, on one side, by an engagement portion which can be inserted below one of said wings with a rotation about an axis which is substantially parallel to the longitudinal extension of the profiled element, suitable for generating a localized deformation of said wing substantially in the portion affected by the longitudinal extension of said protrusion, and, on the other side, by a stop portion which can be engaged below the other one of said wings, said protrusion, in locking position, abutting against the bottom of said seat in at least two points which are mutually spaced in a direction which is transverse to the longitudinal extension of said profiled element.

BRIEF DESCRIPTION OF THE DRAWINGS

Further characteristics and advantages will become apparent from the description of preferred but not exclusive embodiments of a self-locking coupling structure for connecting accessories to profiled elements, according to the invention, illustrated only by way of non-limitative example in the accompanying drawings, wherein:

FIG. 7 is a schematic exploded perspective view of a further embodiment of the coupling structure according to the invention;

FIG. 8 is a schematic transverse sectional plan view of the profiled element coupled to a coupling element for an accessory to be placed on one side of the profiled element;

FIG. 9 is a sectional plan view, similar to FIG. 8, of a coupling element for an accessory to be placed on the other side of the profiled element;

FIG. 10 is a transverse sectional plan view of a further embodiment of the coupling structure according to the invention.

DESCRIPTION OF THE PREFERRED EMBODIMENTS

Figures 1, 2:
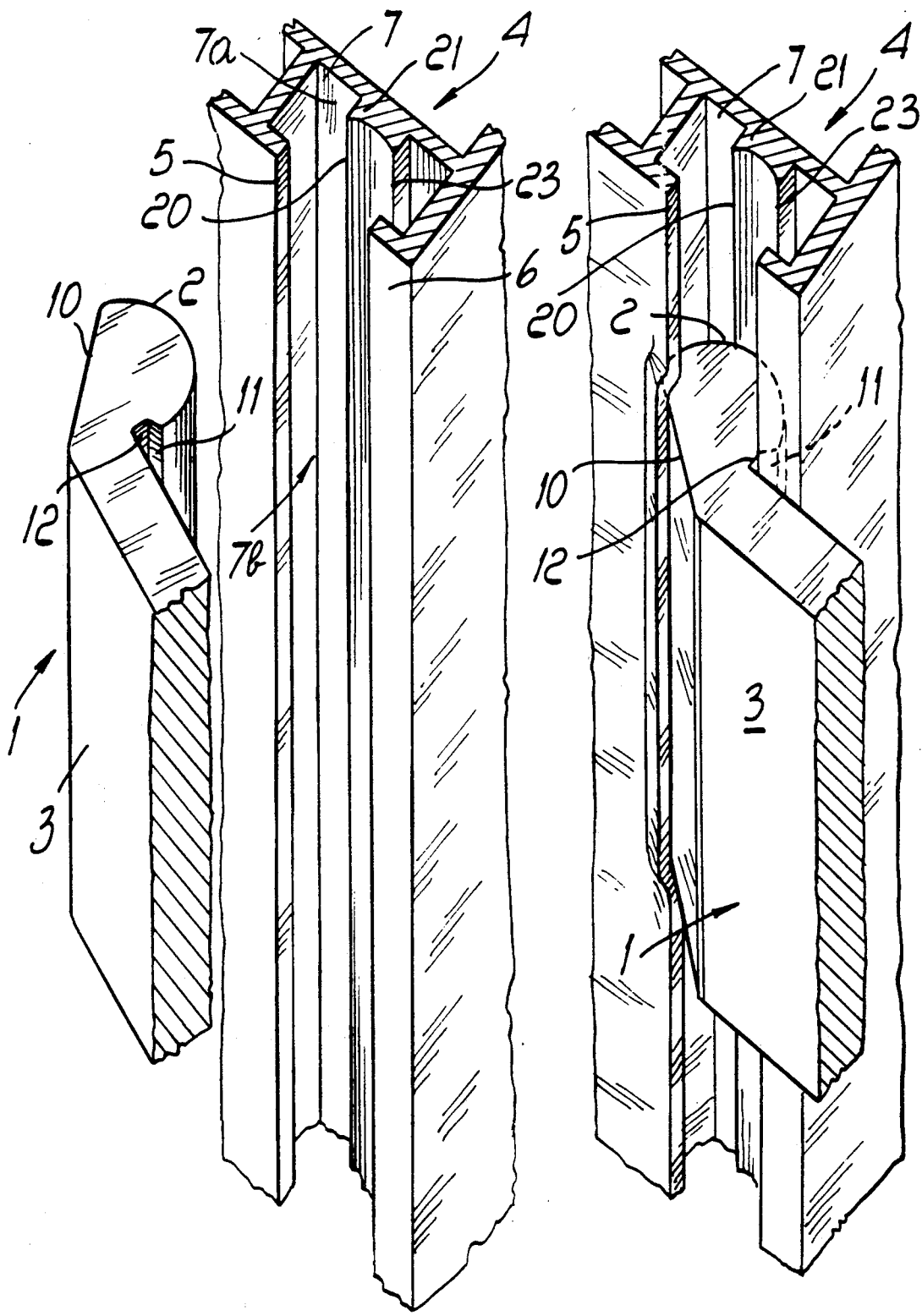
FIG. 1 is a schematic exploded perspective view of the coupling structure with the body uncoupled from the profiled element.
FIG. 2 is a perspective view of the detail of the body coupled to the profiled element.
Figure 3:
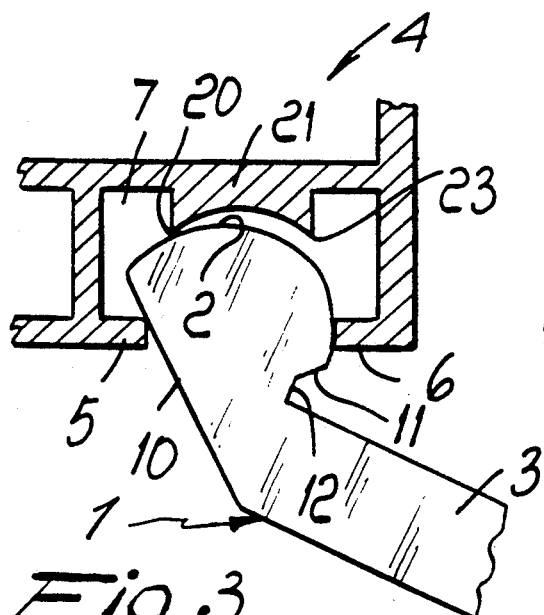
FIG. 3 is a schematic plan view of the step of inserting the body in the profiled element.

With reference to FIGS. 1 to 5, the self-locking coupling structure for connecting accessories to profiled elements, according to the invention, comprises a body, generally indicated by the reference numeral 1, which in its general configuration has a protrusion 2 which is connected to an arm, generally indicated by the reference numeral 3, which can constitute a hinge element, an abutment, a stop element or any other accessory which it is deemed necessary to use in combination with the profiled element, which is generally indicated by the reference numeral 4 and can assume any configuration deemed appropriate.

The profiled element 4 has a first wing 5 and a second wing 6 which are mutually opposite and delimit a seat 7 which extends longitudinally on the profiled element. The seat 7 is also delimited by a bottom 7a, and an opening 7b is defined between the two wings 5 and 6. Such opening 7b is opposite to the bottom 7a and it opens into the seat 7.

In transverse cross section with respect to the body 1, the protrusion 2 has a convex configuration which can be substantially likened to a portion of a cylindrical surface.

The protrusion 2 is delimited on one side by an engagement portion 10 and on the other side by a stop portion, indicated by 11, which defines a groove 12 with respect to the arm 3.

The engagement portion 10 is advantageously inclined with respect to the arm 3.

Figure 5:
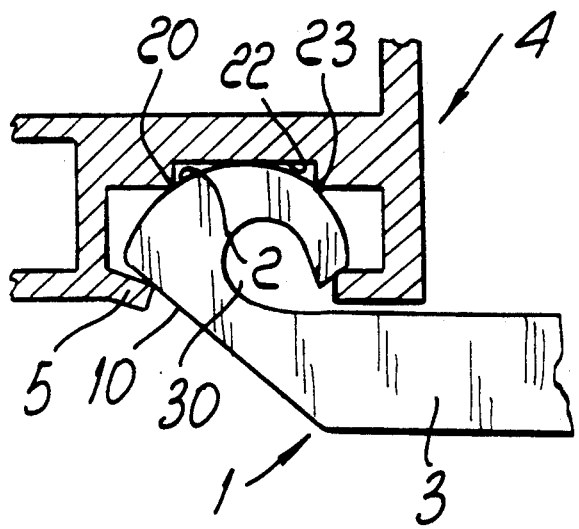
FIG. 5 is a plan view of a further embodiment of the coupling structure according to the invention.

In order to couple the body 1 to the profiled element 4, a part of the protrusion 2 and a part of the engagement portion 10 are first inserted under the wing 5 until the protrusion 2 is in contact with a first abutment edge 20 which can be defined on the bottom 7a of the seat 7 by a protruding portion 21 or is possibly delimited by a depressed portion or groove 22, as schematically illustrated in FIG. 5.

By exploiting the contact point abutment of the curved protrusion 2 on the first abutment edge 20, the body 1 is rotated about an axis which is substantially parallel to the longitudinal extension of the profiled element 4, moving the engagement portion 10 below the wing 5 and continuing the rotation until a localized deformation of the wing 5 is performed, as illustrated in FIG. 2; said deformation may even affect the entire longitudinal extension of said protrusion 2.

The rotation is continued until the stop portion 11 inserts below the wing 6.

Insertion below the wing 6 is obtained by mutual elastic deformation of the wing 6 and of the protrusion 2; said elasticity can be assigned to the elastic resiliency of the wing 6 or can possibly be obtained, as illustrated in FIG. 5, by making the protrusion resiliently elastic by virtue of the presence of a recess, indicated by 30, inside said protrusion.

When the stop portion inserts below the wing 6, which in practice wedges the wing 6 inside the groove 12, the protrusion 2 makes contact with a second abutment edge 23 which is defined on the bottom 7a of the seat 7 and is spaced from the first abutment edge, indicated by 20, in a transverse direction with respect to the longitudinal extension of the profiled element.

In these conditions, the body 1 is perfectly and automatically locked on the profiled element, since its sliding in a longitudinal direction with respect to the profiled element is prevented by the deformation of the wing 5, whereas any other movement in a transverse direction or by rotation is prevented due to the fact that the protrusion is retained by the two abutment edges and by the coupling of the engagement portion 10 with the first wing 5 and of the stop portion 11 with the second wing 6.

Figure 4:
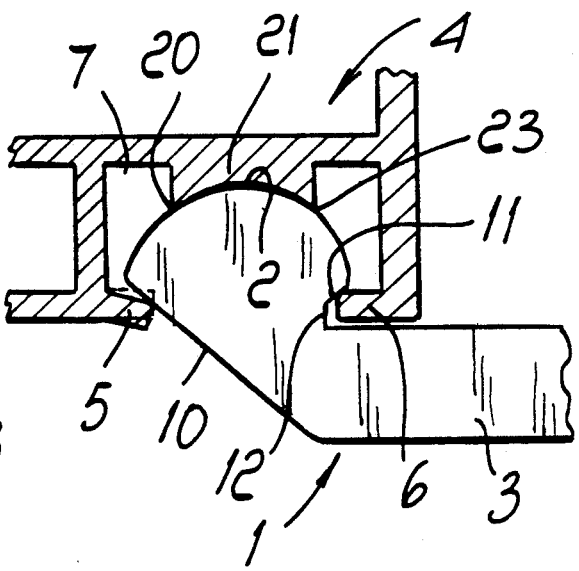
FIG. 4 is a schematic plan view of the body inserted in the profiled element.

As previously mentioned, it is essential that there be two transversely spaced abutment edges on the bottom of the groove, but the engagement of the protrusion 2 can obviously extend on a larger region on the bottom of the groove, as schematically illustrated in FIG. 4, and the abutment edges can be variously obtained both by providing protrusions on the bottom of the groove or seat and by depressing or providing grooves in the central region of the bottom of the seat.

Figure 6:
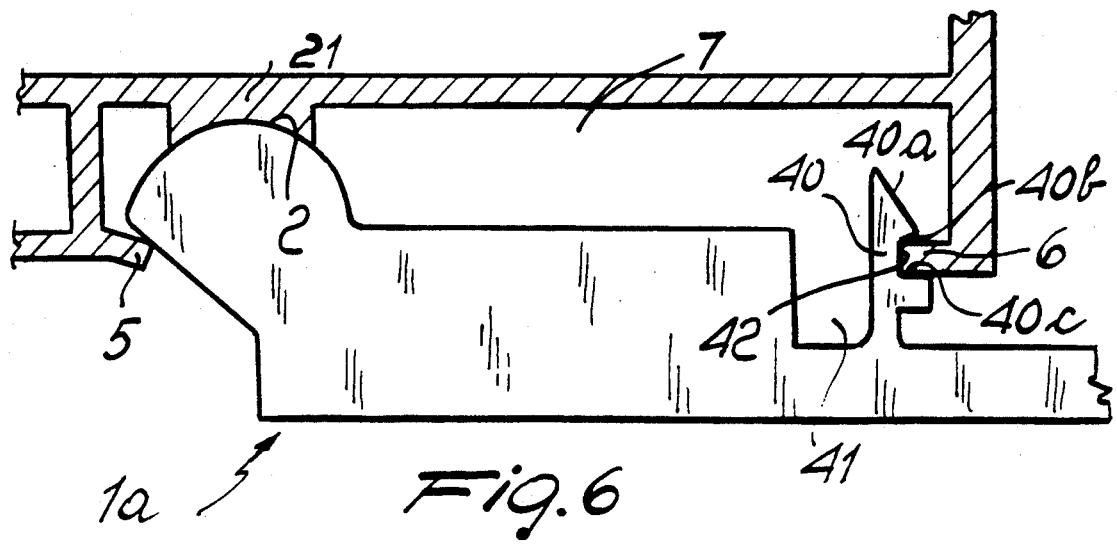
FIG. 6 is a plan view of still another further embodiment of the coupling structure according to the invention.

According to a variated embodiment, illustrated in FIG. 6, particularly indicated in the use of profiled elements for which the seat 7 has a considerable transverse extension, or when the wings 5 and 6, for which the same reference numerals have been kept, are considerably spaced from one another, the protruding or depressed portion 21 is located proximate to the wing 5, and the body of the coupling structure, indicated in this case by the numeral 1a, has, along the arm 3, a coupling wing 40 intended to engage snap-together with the wing 6.

In this case, the engagement between the coupling wing 40 and the wing 6 can be obtained by means of the elastic yielding of the wing 6 and/or by means of the elastic yielding of the coupling wing 40, the flexibility whereof depends on its thickness, which, in the embodiment of the invention shown in FIG. 6, is dimensionally independent of the remaining part of the body 1a due to the advantageous presence of a depression 41 on the side directed toward the protrusion 2. The coupling between the wing 6 and the wing 40 is advantageously facilitated by the profiled end 40a of the wing 40 and is locked by two opposite shoulders 40b and 40c which delimit a seat 42 for the wing 6.

In another preferred but not exclusive embodiment of the invention, a profiled element 100, illustrated in FIGS. 7 to 10, is advantageously provided, said profiled element 100 having a pair of opposite wings, indicated by the reference numerals 102 and 103, which delimit a seat 104 which extends longitudinally on the profiled element.

According to the invention, two coupling regions 105 and 106 are defined on the bottom of said seat 104, are mutually spaced in a transverse direction with respect to the extension of the profiled element and can be selectively engaged, according to the requirements, with a self-locking coupling element generally indicated by the reference numeral 107.

Said self-locking coupling element 107 comprises an arm 108 intended to support the accessory to be applied to the profiled element, which is constituted, in the illustrated case, by a hinge, and by a protrusion 109 which is arranged at an end of said arm and has a curved surface 110 which can be coupled to one of the coupling regions 105 or 106.

The protrusion 109 has a convex configuration in transverse cross section with respect to the body 107 which can be substantially likened to a portion of a cylindrical surface.

The protrusion 109 is delimited, on one side, by an engagement portion 111 which is appropriately inclined with respect to the arm 108 and is intended to be inserted under one of the wings 102 or 103, more particularly under the wing which is closest to the coupling region occupied by the protrusion 109.

On the side of the arm 108 which is intended to be directed toward the seat 104, on the side opposite to the engagement portion 111 with respect to the protrusion 109, there is a stop portion 112 which can be engaged below the other wing 102 or 103, more particularly under the wing which is most distant with respect to the coupling region occupied by the protrusion 109.

Each of the coupling regions 105 and 106 defines at least two resting edges 113, 114 for the protrusion 109 which are mutually spaced in a transverse direction with respect to the profiled element.

Said two resting edges can be defined on a raised portion 115 provided on the bottom of the seat 104 or can be defined at the sides of a central depression or groove 115a for each of the coupling regions 105 and 106, as illustrated in FIG. 10.

Conveniently, the stop portion 112 is defined on a locking wing 116 which protrudes from the side of the body 107 which is to be directed toward the seat 104 and delimits, with an opposite shoulder, an accommodation recess for the wing 102 or 103. The free end of said locking wing 116 conveniently has a profiled guiding portion 116a which facilitates the snap-together coupling of the wing 116 to the wing 102 or 103.

The coupling regions 105 and 106 are arranged respectively proximate to the wing 102 and to the wing 103 and are arranged symmetrically with respect to the median plane of the seat 104. In this manner, it can be seen that a myriad number of connection combinations can be obtained while using coupling elements 107 of different dimensions with the same profiled element 100.

The assembly of the coupling element on the profiled element is performed in the same manner as cited above.

From what has been described it can thus be seen that the invention achieves the intended aim and objects and in particular the fact is stressed that a self-locking coupling structure is provided which requires no machinings on the profiled element and can perform the securing simply by virtue of the localized deformation of a part of the first wing an by virtue of the multiple-point abutment which is provided inside the seat.

The invention thus conceived is susceptible to numerous modifications and variations, all of which are within the scope of the inventive concept.

All the details may furthermore be replaced with other technically equivalent elements. In practice, the materials employed, as well as the contingent shapes and dimensions, may be any according to the requirements.

I claim:

1. In combination, a profiled element and a self-locking coupling element, said profiled element having a longitudinal extension, said profiled element comprising a seat defined therein which extends in the direction of said longitudinal extension, said seat being delimited by a bottom and by a pair of opposite wings of said profiled element, an opening being defined between said pair of opposite wings which substantially extends in the direction of said longitudinal extension and which opens into said seat, said bottom being arranged opposite to said opening, said self-locking coupling element comprising a substantially convex semicylindrical protrusion which is inserted through said opening and accommodated in said seat of said profiled element; said self-locking coupling element further comprising an engagement portion which extends from said semicylindrical protrusion inside said seat through said opening outside of said seat, said engagement portion being in locked engagement with a locally deformed portion of one of said pair of opposite wings, said locally deformed portion of said one of said pair of opposite wings substantially extending in the direction of said longitudonal extension and being deformed with respect to the remaining portion of said one of said pair of opposite wings in a direction away from said bottom of said seat, said bottom of said seat comprising at least one coupling region which defines a first abutment edge and a second abutment edge which both extend substantially in the direction of said longitudinal extension, said first abutment edge being arranged near said one of said pair of opposite wings and said second abutment edge being arranged nearer the other of said pair of opposite wings, said semicylindrical protrusion being in locked engagement with both of said first abutment edge and said second abutment edge, said self-locking coupling element further comprising a stop portion which extends inside said seat substantially in the direction of said longitudinal extension and which lockingly engages inside said seat with the other of said pair of opposite wings of said profiled element.

2. The combination of claim 1, wherein said first abutment edge and said second abutment edge are defined on a protrusion provided at said bottom of said seat.

3. The combination of claim 2, wherein said protrusion is substantially shaped like a portion of a cylindrical surface.

4. The combination of claim 1, wherein said first abutment edge and said second abutment edge are defined by a central groove provided at said bottom of said seat.

5. The combination of claim 1, wherein a first coupling region and a second coupling region are provided at said bottom of said seat, said first and said second coupling regions being mutually spaced in a direction perpendicular to said longitudinal extension.

6. The combination of claim 1, wherein said stop portion couples, with mutual elastic yielding, to the other of said opposite pair of wings of said profiled element.

7. The combination of claim 1, wherein said stop portion of said self-locking coupling element extends directly from said semicylindrical protrusion opposite to said engagement portion.

8. The combination of claim 7, wherein said semicylindrical protrusion is provided with a central longitudinally extending recess.

9. The combination of claim 1, wherein said stop portion is defined on an elastically yielding wing element provided on an arm of said self-locking coupling element which extends from said semicylindrical protrusion in a direction perpendicular to said longitudinal extension.

* * * * *